US006748134B2

United States Patent
Bigo et al.

(10) Patent No.: US 6,748,134 B2
(45) Date of Patent: *Jun. 8, 2004

(54) FREQUENCY ALLOCATION SCHEME AND TRANSMISSION SYSTEM FOR POLARIZATION AND WAVELENGTH DIVISION MULTIPLEXED SIGNALS WITH LEFT AND RIGHT SIDE FILTERING

(75) Inventors: Sébastien Bigo, Palaiseau (FR); Yann Frignac, Paris (FR); Wilfried Idler, Markgröningen (DE)

(73) Assignee: NEC Corporation, Tokyo (JP)

( * ) Notice: Subject to any disclaimer, the term of this patent is extended or adjusted under 35 U.S.C. 154(b) by 21 days.

This patent is subject to a terminal disclaimer.

(21) Appl. No.: 10/066,711

(22) Filed: Feb. 6, 2002

(65) Prior Publication Data

US 2002/0114562 A1 Aug. 22, 2002

(30) Foreign Application Priority Data

Feb. 16, 2001 (EP) .............................. 01 440033

(51) Int. Cl.[7] ................................ G02B 6/28
(52) U.S. Cl. ................ 385/24; 359/114; 359/115; 359/124
(58) Field of Search .................. 385/24; 359/114, 359/115, 124

(56) References Cited

U.S. PATENT DOCUMENTS 6,208,444 B1 * 3/2001 Wong et al. ............. 359/127
6,373,604 B1 * 4/2002 Xie ......................... 359/124
2002/0109888 A1 * 8/2002 Bigo et al. ............... 359/173

OTHER PUBLICATIONS

S. Bigo, et al.: "Multi–terabit/s transmission over Alcatel Teralight fiber", Alcatel Telecommunications Review Online!, Oct. 1, 2000, pp. 288–296.
Ono T et al.: "Key Technologies for Terabit/Second WDM Systems with High Spectral Efficiency of Over 1 Bit/S/Hz", IEEE Journal of Quantum Electronics, Nov. 1998, pp. 2080–2088, vol. 34, No. 11, IEEE Inc, New York, US.
Forghieri F et al.: "WDM Systems with Unequally Spaced Channels", Journal of Lightwave Technology, IEEE., May 1, 1995, vol. 13, No. 5, New York, US.
Bigo, S. et al.: "10.2 Tbit/s (256×42.7Gbit/s PDM/WDM) transmission over 100 Km Teralight with 1.28bit/s/Hz spectral efficiency", Optical Fiber Communication Conference and Exhibit 2001, OFC 2001, Mar. 17–22, 2001, pp. 25–1–25–3.
Bigo, S. et al.: "5.12 Tbit/s (128×40 Gbit/s WDM) Transmission over 3×100 km of TeraLight FIBRE", paper PD2, PP40–41, ECOC 2000.

* cited by examiner

Primary Examiner—Robert H. Kim
Assistant Examiner—George Y. Wang
(74) Attorney, Agent, or Firm—Sughrue Mion, PLLC

(57) ABSTRACT

A frequency allocation scheme for optical channels transmitted via a WDM transmission line with alternating left side and right side filtering for adjacent channels, with alternating channel spacing of A and B, where A<B, and with two sets of channels orthogonally polarized.

3 Claims, 4 Drawing Sheets

Figure 1:
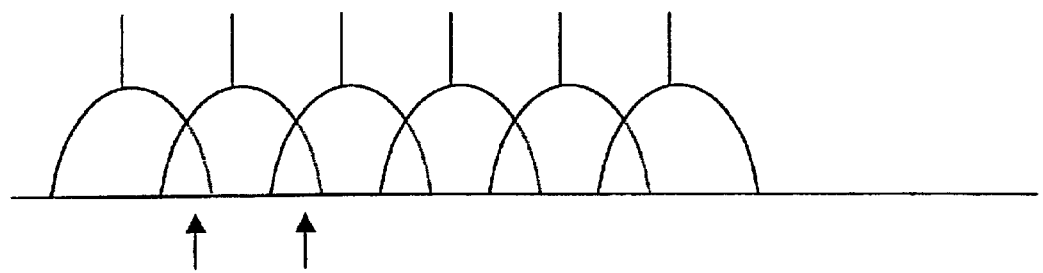

FREQUENCY ALLOCATION SCHEME AND TRANSMISSION SYSTEM FOR POLARIZATION AND WAVELENGTH DIVISION MULTIPLEXED SIGNALS WITH LEFT AND RIGHT SIDE FILTERING

BACKGROUND OF THE INVENTION

The invention relates to the field of transmitting digital data by optical means. It is more particularly concerned with transmission at high bit rates on long-haul fiber optic links.

More specifically, the invention is related to a frequency allocation scheme for a set of optical channels (each at specific carrier frequency) multiplexed using wavelength-division multiplexing and polarization-division multiplexing.

The invention is also related to a transmission system with a transmitter function, a transmitting fiber and a receiver function and the transmitter function comprises light sources, with modulators, possibly polarizers and a wavelength multiplexer and the receiver function comprises one or several polarization demultiplexers, a wavelength demultiplexer, filters and receivers.

Such a transmission scheme uses an optical transmitter connected to an optical receiver by the fiber link. The transmitter generally modulates the power of an optical carrier wave from a laser oscillator as a function of the information to be transmitted. NRZ or RZ modulation is very frequently used and entails varying the power of the carrier wave between two levels: a low level corresponding to extinction of the wave and a high level corresponding to a maximum optical power. The variations of level are triggered at times imposed by a clock rate and this defines successive time cells allocated to the binary data to be transmitted. By convention, the low and high levels respectively represent the binary values "0" and "1".

The maximum transmission distance is generally limited by the ability of receivers to detect without error these two power levels after the modulated wave has propagated in the optical link. The usual way to increase this distance is to increase the ratio between the average optical power of the high levels and that of the low levels; this ratio defining the "extinction ratio" which is one of the characteristics of the modulation. For a given distance and a given extinction ratio, the information bit rate is limited by chromatic dispersion generated in the fibers. This dispersion results from the effective index of the fiber depending on the wavelength of the wave transported, and it has the consequence that the width of the transmitted pulses increases as they propagate along the fiber. This phenomenon is characterized by the dispersion coefficient D of the fiber, which is defined as a function of the propagation constant $\beta$ by the equation $D=-(2\pi c/\lambda^2)d^2\beta/d\omega^2$, where $\lambda$ and $\omega$ are respectively the wavelength and the angular frequency of the wave.

Not only does chromatic dispersion limit the possibility of transmission, but also it is a main factor for distortion. Increasing the data rate up to higher levels about T Bit/s—the effects of the fibers increase the impact on the received signal. One solution is the use of DWDM (dense wavelength division multiplex) systems to increase the bit rate. The wavelength channels are selected in a way that the information of the single channels can be selected at the receiver side and analyzed with an acceptable bit/error rate. Again, the bit rate is limited by the spectrum of the channels.

A modulation scheme know as VSB (vestigial side band modulation) is explained in "5.12 Tbit/s Transmission over 3×100 km of Teralight fiber" Bigo, S. et al., paperPD2, PP40–41, ECOC 2000.

The two side bands of a NRZ spectrum generally contain redundant information. It is therefore tempting to filter out one of them in order to increase spectral efficiency, a technique known as VSB. However VSB is difficult to implement at the transmitter because the suppressed side bands rapidly reconstruct through fiber non linearities.

So a VSB filtering at the receiver side is proposed. With a modulation and filtering scheme like VSB, the bandwidth efficiency increases to a value of more than 0.6 bit/s/Hz compared with 0.4 bit/s/Hz in conventional systems.

Again the transmission is limited due to the effects of cross talk between the adjacent channels.

SUMMARY OF THE INVENTION

The inventive solution comprises a VSB filtering scheme with alternating side band filtering and two sets of channels orthogonally polarized. The increase of bandwidth efficiency is important. The effects of cross talk between adjacent channels are minimized.

Each of these channels is generated by passing light into a modulator. The resulting optical spectrum consists of a carrier and two optical sidebands apart the carrier. The lower-wavelength sideband is referred to next as "left side" and the higher-wavelength side-band is referred to as "right-side". When sent into the transmission system, such spectrum is passed into a cascade of optical components with a filtering transfer function, such as wavelength division multiplexers, wavelength division demultiplexers, specific filters, etc. whether located within the transmitter or the receiver or in-line.

In the invention, the total set of modulated channels is divided into two frequency-interleaved subsets to be polarization-multiplexed with orthogonal polarizations. In each subset, the channel spacing is alternatively A and B, from one channel to another, with A<B.

Furthermore, for each channel, the peak of the overall filter response (i.e. the product of all the filtering transfer functions along the system) is chosen so as to fall off the carrier frequency, such that the channels of each sub-set are alternatively left- and right-filtered. This is analogous to the vestigial-sideband (VSB) filtering technique, well-known to the radio engineers.

SHORT DESCRIPTION OF THE DRAWINGS

FIG. 1 Spectrum of adjacent channels in DWDM

Figure 2:
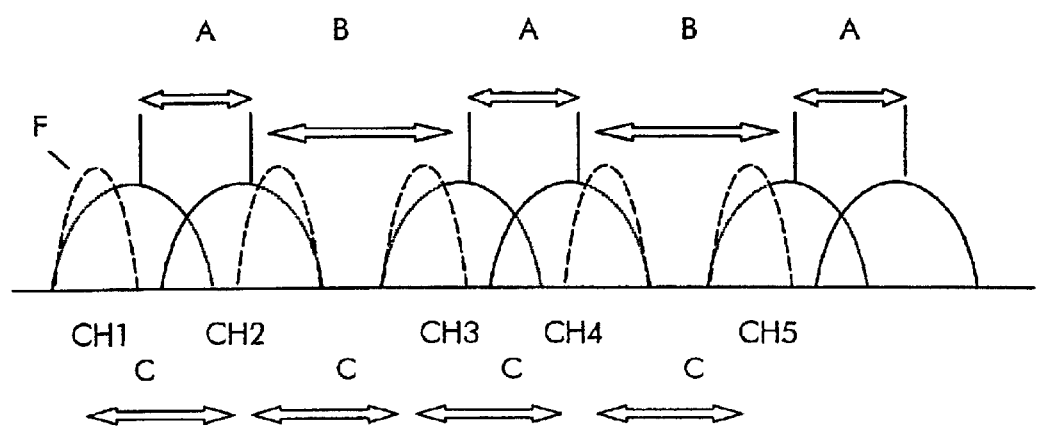

FIG. 2 Vestigial Side band filtering for non-equidistant channels

Figure 3:
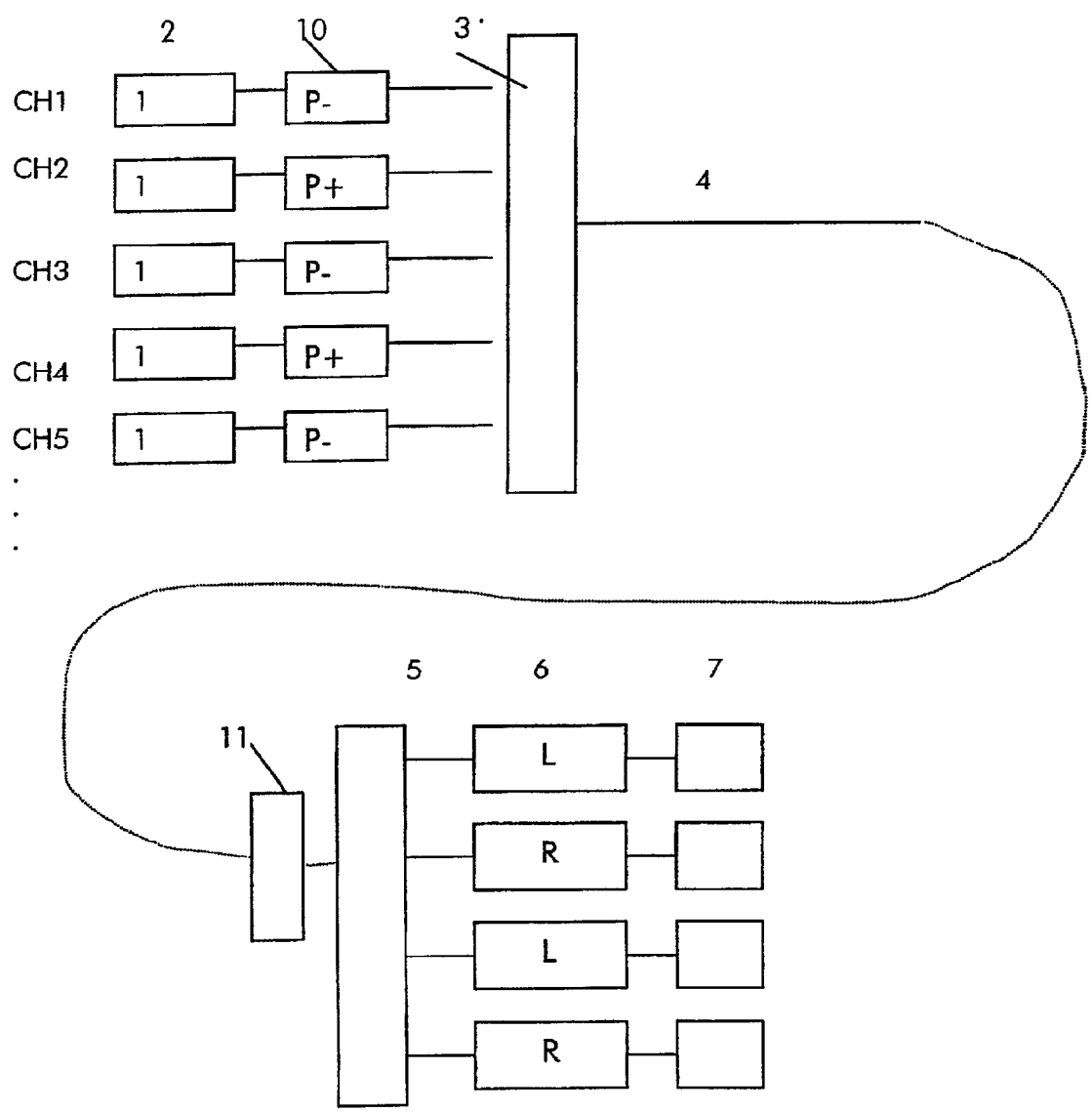

FIG. 3 Transmission system with polarizers

Figure 4:
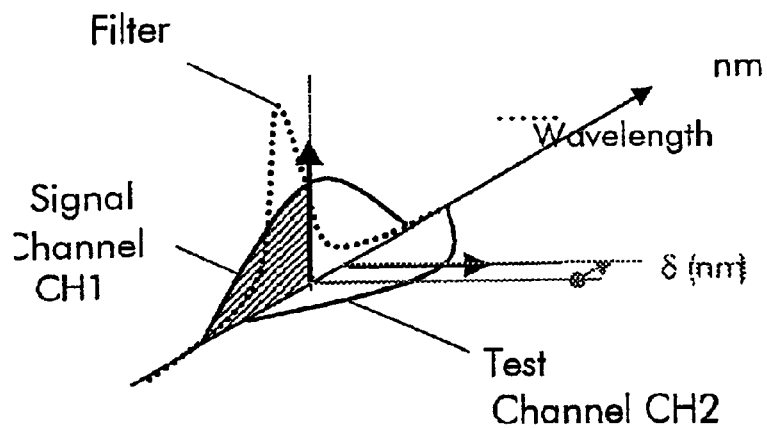

FIG. 4 Model of adjacent channels

Figure 5:
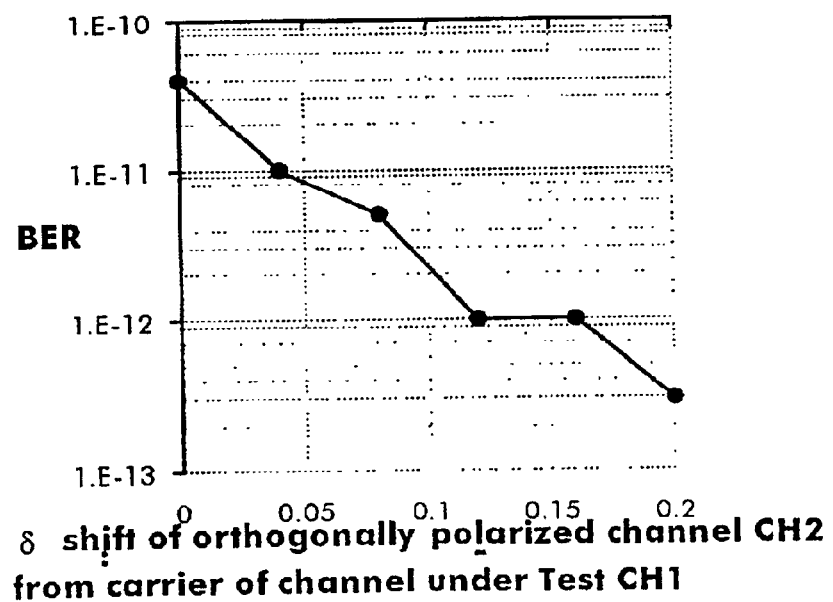

FIG. 5 Measurement of BER

Figure 6:
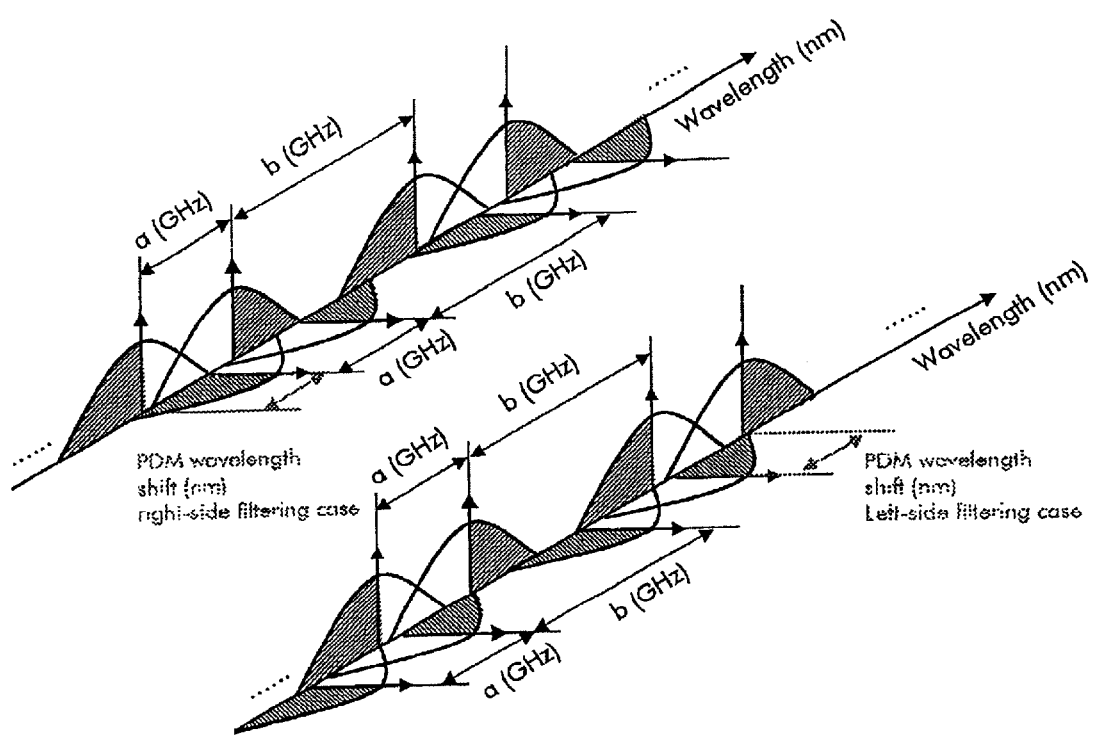

FIG. 6 Schematic channel management

DETAILED DESCRIPTION OF THE INVENTION

The spectrum of a NRZ signal is symmetric to the carrier frequency of the wavelength channels. In FIG. 1 a line marks the carrier. The left and the right sides of the signal contain the same information. In the overlapping areas marked by an arrow, the information of one channel can no longer be clearly distinguished from the adjacent channels information. If the channel spacing decreases as in a DWDM (dense wavelength division multiplex), the overlapping areas increase.

FIG. 2 shows a channel distribution which is not equidistant. The first two channels CH 1 and CH 2 are separated by a space A. The distance to the next channel CH3 is then space B. Then, pairs of channels are transmitted separated by a larger space than the space between the channels of each pair. Now, the filtering function F filters the left side of channel CH1 and the right side of Channel CH2. Again CH3 is left side filtered and CH4 is right side filtered. The bandwidth can be used in an optimal way.

One embodiment of the invention is shown in FIG. 3. The transmitter function is realised with lasers 1 and modulators 2. If not initially linearly polarized, the laser and modulators are connected first to polarizers and then to a wavelength multiplexer 3. The multiplexer is tapped to the transmission line 4. The receiver function is realised with one polarisation demultiplexer 11, followed by a wavelength demultiplexer 5 connected to filters 6. Another configuration is to use a wavelength demultiplexer 5 followed by several polarization demultiplexers 11 before the filters 6. The filters are attached to receivers 7.

The laser 1 sends a first wavelength channel. A modulator 2 modulates this channel. The first channel CH1 is linearly polarized. The second channel CH2 is polarised orthogonal to the first channel and so on. The signal is multiplexed together with the other channels in the multiplexer 3. The multiplexed signals are transmitted over the transmission line 4 to the polarisation demultiplexer 11. The two orthogonal polarizations are separated and fed into the wavelength demultiplexer 5. Here the DWDM signal is demultiplexed in the different wavelength channels. The first wavelength channel CH1 is then filtered by left-side filtering, and the second channel which was orthogonally polarised is also filtered by a left side filtering and so on. The next two channels are right side filtered.

The performance of the solution to interleave two sets of equally spaced-odd and even channels with orthogonal polarisations and demultiplexed with a tracking polariser at the receiver end was demonstrated in a 6.4 Tbit/s (160×40 Gbit/s) transmission experiment over 186 km distance.

FIG. 4 shows the principle of the orthogonal polarisation of adjacent channels. We consider here one channel CH1 at 40 Gbit/s (namely the signal), at 1588.34 nm. The signal CH1 is VSB-filtered (left side) and the dispersion map is optimised. Here, a new channel CH2 (namely the test channel) is added to the multiplex and injected in the line with orthogonal polarisation with respect to the channel CH1 (and different information) at a tuneable wavelength within 1588.34 nm±1 nm. Both test and signal channels are demultiplexed with a polariser before the receiver. For this preliminary experiment a 100 km-long span of fibre is used.

The BER performance of CH1 is shown in shown in FIG. 5 as a function of tuned test channel wavelength CH2, detuned by $\delta \approx -0.1$ nm off the carrier of the signal wavelength. When the signal wavelength matches the test wavelength, the performance is $5 \cdot 10^{-11}$. This performance is already a significant improvement with respect to the configuration where Polarisation Division Multiplex is obtained from an identical laser for the test and signal channels, as explained by a reduced coherence. But remarkably, BER drops to $5 \cdot 10^{-13}$ when the channel test wavelength is offset from the carrier towards the unfiltered signal side band. On the other hand, offsetting the channel test wavelength towards the filter central frequency naturally enhanced the cross-talk with between test and signal (as illustrated by strong variations of the BER with time, a signature of PDM crosstalk), the lowest performance being obtained when $\delta \approx \div 0.1$ nm. In other words, the introduction of PDM has the most detrimental impact when the carrier of the orthogonal channel CH2 coincides with the centre of the signal filter.

Even though the performance recorded in FIG. 5 has nothing in common to that of a fully loaded system, two conclusions can be derived from this experiment:

1) It confirms that multiplexing/demultiplexing polarisations on a polarisation per wavelength basis offers more potential than conventional Polarisation Division Multiplex
2) This approach can be further improved when combined with asymmetric VSB filtering.

To reach higher spectral efficiencies than 0.8 bit/s/Hz, the wavelength allocation scheme of FIG. 6 is used, where the grey areas represent the side bands to be filtered. The basic idea behind this scheme is to make sure that the carriers of the channels orthogonally-polarised to that being filtered fall as far as possible off the filter centre.

The two solutions have similar performances (deduced by 90° rotation). Channels along the same polarisation are alternatively spaced by A GHz and B GHz assuming A<B without loss of generality. Given a channel plan with (A,B), the channel plan along the other polarisation should follow the same (A,B) requirement, but shifted with respect to the other either towards higher wavelengths or lower wavelengths by:

$$A/2 + \delta_{filter}, \pm 20\%,$$

$\delta_{filter}$ being the frequency shift (from the filter centre to the carrier) for optimal VSB filtering. In the case where $\delta_{filter}$ is not identical when left-side and right-side filtering are implemented, an average $\delta_{filter}$ should be used.

What is claimed is:

1. A frequency allocation scheme for optical channels transmitted via a WDM transmission line with alternating left side and right side filtering for adjacent channels, comprising:

channels with alternating channel spacing of A and B, where A<B, and two sets of channels orthogonally polarized, where the two sets of orthogonally polarized channels are shifted versus each other by a value $A/2 + \delta_{Filter}, \pm 20\%$.

2. The frequency allocation scheme according to claim 1, further comprising means at a receiver for alternating left-side and right-side filtering sidebands of the adjacent channels.

3. A transmission system with a transmitter function, a transmitting fiber and a receiver function, wherein:

the transmitter function comprises polarized light sources (1), with modulators (2) and a wavelength multiplexer (3); and the receiver function comprises at least a polarization demultiplexer (11), a wavelength demultiplexer (5), filters and electrical receivers, said filters performing alternating left-side and right-side filtering for adjacent received channels which are transmitted, via a WDM transmission line, with alternating channel spacing of A and B where A<B, and two sets of the channels being orthogonally polarized and shifted versus each other by a value $A/2 +_{Filter}, \pm 20\%$.

* * * * *

UNITED STATES PATENT AND TRADEMARK OFFICE
CERTIFICATE OF CORRECTION

PATENT NO. : 6,748,134 B2
DATED : June 8, 2004
INVENTOR(S) : Bigo et al.

It is certified that error appears in the above-identified patent and that said Letters Patent is hereby corrected as shown below:

<u>Title page,</u>
Item [73], Assignee, change to -- Alcatel, Paris, France --

Signed and Sealed this

Twenty-third Day of November, 2004

JON W. DUDAS
*Director of the United States Patent and Trademark Office*